United States Patent Office
3,135,806
Patented June 2, 1964

3,135,806
BISYMMETRICAL ARYL POLYHYDROXY
ALKYL ETHERS
Robert Steckler, Chagrin Falls, Ohio, Jesse Werner, Holliswood, N.Y., and Frederick A. Hessel, Montclair, N.J., assignors to General Aniline & Film Corporation, New York, N.Y., a corporation of Delaware
No Drawing. Filed Sept. 14, 1960, Ser. No. 55,849
7 Claims. (Cl. 260—613)

This invention relates to a new class of bisymmetrical aryl polyhydroxy alkyl ethers which are useful per se and as intermediates in the preparation of a diversified number of new and useful chemical products.

We have discovered that bisymmetrical phenolic compounds obtained by the condensation of monohydric or polyhydric phenols with polyalkoxy acetals are readily reactive with alkylene oxides and alkylene carbonates to yield bisymmetrical aryl polyhydroxy alkyl ethers which are useful per se, and which may be sulfated or sulfonated to yield water-soluble surfactants i.e., detergents, wetting agents, etc. In addition, they may be reacted with isocyanates to form novel and useful polyurethanes. They may also be reacted with mono- and/or poly-functional acids, i.e. saturated or unsaturated to yield a new and interesting class of polyesters and alkyd resins.

The bisymmetrical phenolic compounds which are reacted with an alkylene oxide or alkylene carbonate in accordance with the present invention are characterized by a structure corresponding to the following general formula:

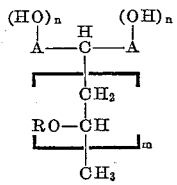

wherein A represents an aryl group such as phenyl, diphenyl, naphthyl or anthracyl, R represents an alkyl radical of 1 to 5 carbon atoms, $m$ represents a positive integer of from 2 to 30 and $n$ represents a positive integer to form 1 to 3.

These bisymmetrical phenolic compounds are prepared by condensing 1 mole of a polyalkoxy acetal with 2 moles of a monohydric or polyhydric phenol. The polyalkoxy acetals are characterized by the following general formula:

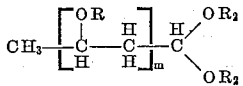

wherein $m$ and R have the same values as given above and $R_2$ represents an alkyl group of from 1 to 5 carbon atoms. These polyalkoxy acetals are prepared in accordance with the procedures disclosed in United States Patents 2,165,962 and 2,487,525. In general, they are prepared by the reaction of a vinyl alkyl ether with a lower alcohol. The higher polyalkoxy acetals wherein $m$ ranges from 2 to 30 are obtained by condensing 1 mole of an alcohol such as methanol, ethanol, propanol, butanol, etc. with 2 to 30 moles of a vinyl methyl ether, vinyl ethyl ether, vinyl propyl ether, vinyl butyl ether, etc.

As illustrative of such polyalkoxy acetals, the following may be mentioned:

1,1,3,5-tetramethoxy hexane
1,1,3,5-tetraethoxy hexane
1,1-diethoxy-3,5-dimethoxy hexane
1,1,3,5,7-pentamethoxy octane
1,1,3,5,7,9-hexamethoxy decane
1,1,3,5,7,9,11-heptamethoxy dodecane
1,1,3,5,7,9,11,13-octamethoxy tetradecane
1,1,3-trimethoxy-5-ethoxy hexane
1,1-dimethoxy-3,5-ethoxy hexane
1,1-dimethoxy-3,5,7-ethoxy octane
Higher polyalkoxy acetals obtained by condensing 1 mole of lower alcohol with 10–30 moles of vinyl alkyl ether.

It is to be further noted that a mixture of two or more of the foregoing specific polyalkoxy acetals may be condensed with a mono- or poly-hydric phenol. The ratio of the polyalkoxy acetals constituting the mixture is immaterial, as only 1 molecular equivalent thereof will condense with 2 molecular equivalents of the mono- or polyhydric phenol.

The monohydric or polyhydric phenols which are condensed with the foregoing polyalkoxy acetals include phenol, o-, m-, and p-cresol, ethyl phenol, isopropyl phenol, butyl phenol, tertiary butyl phenol, hexyl phenol, octyl phenol, nonyl phenol, decyl phenol, dinonyl phenol, dodecyl phenol, tridecyl phenol, diisobutyl phenol, 3-pentadecyl phenol, stearyl phenol, 2,4- and 3,5-xylenol, cardanol, α- and β-naphthols, 2- and 9-hydroxy anthracene, 1,8-dihydroxyanthranol, orcinol, catechol, pyrocatechol, resorcinol, methyl resorcinol, pyrogallol, 4,4'-dihydroxydiphenyl, 1,5-dihydroxy naphthalene, and the like. It is to be noted that cardanol is a technical grade of anacardol having the formula:

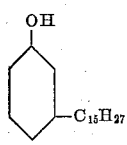

wherein the $C_{15}$ side chain contains two double bonds and is linear.

From a visual inspection of the generic formula of the bis-phenolic compounds utilized in accordance with the present invention, it will be noted that the aryl nuclei characterized by A are joined by a carbon atom bearing a polyalkoxy alkane chain as a substituent instead of the conventional alkane chain ranging from 1 to 5 carbon atoms. The presence of the polyalkoxy alkane chain in the bis-phenol compounds of the present invention provides the new and unexpected property of imparting to the bis-phenols greatly improved compatibility with polar type chemicals, increased reactivity with lower aldehydes, alkylene oxides and alkylene carbonates.

In preparing the foregoing bis-phenolic compounds, 2 moles of a monohydric or polyhydric phenol are condensed with 1 mole of a polyalkoxy acetal under the usual reaction conditions. As catalyst, we have found that acids such as sulfuric acid, phosphoric acid, chloracetic acid, dichloracetic acid, trichloracetic acid, trifluoracetic acid, fluoboric acid, hydrochloric acid, alkane sulfonic acids, aryl sulfonic acids, etc., may be employed. The catalyst concentration and temperature of reaction should be such as to eliminate possible side reactions. In other words, there is a relationship between the reactivity of the monohydric or polyhydric phenol and the reaction conditions employed. Very reactive phenols such as phenol, resorcinol, phloroglucinol and the like will react rapidly with the polyalkoxy acetals in the presence of dilute acids and mild temperatures such as 35–50° C. Less reactive phenols such as o-cresol, 2,4- and 3,5-xylenols, 2-anthrol and 1,5-dihydroxy naphthalene and the like are best reacted at or near reflux by employing a strong concentration of an acid such as will not cause sulfonation of the resulting product thereby diminishing the yield. Under such circumstances, instead of the inorganic acids, alkyl or aryl sulfonic acids are preferred. The acids which may be used include among others:

| Sulfuric acid | Trifluoracetic acid |
| Phosphoric acid | Fluoboric acid |
| Chloracetic acid | Hydrochloric acid |
| Dichloracetic acid | Alkane sulfonic acids |
| Trichloracetic acid | Aryl sulfonic acids |

The bisymmetrical aryl polyhydroxy alkyl ethers prepared in accordance with the present invention while employing the foregoing bisymmetrical phenolic compounds and alkylene oxides or alkylene carbonates are characterized by the following general formula:

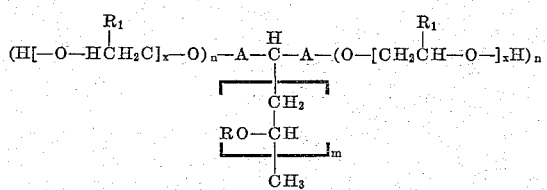

wherein A, R, m and n have the same values as given above and $R_1$ represents either hydrogen, methyl or ethyl and x represents a positive integer of from 1 to 40. The length of the alkyloxy or polyalkoxy chain characterized by x will be dependent upon the number of moles of either alkylene oxide or alkylene carbonate employed. This may range from 1 to 40 moles or higher of alkylene oxide or alkylene carbonate for each hydroxyl group present in the bis-phenolic compound. The addition of the alkyloxy or polyalkoxy chains to the bis-phenol compound is carried out by conventional alkoxylation procedures as described in United States Patents 1,970,578; 2,213,477; 2,575,832; 2,593,112 and 2,676,975, the disclosures of which are incorporated by reference thereto as illustrative of such procedures. Since the addition of the alkylene oxide such as ethylene oxide, 1,2-propylene oxide or 1,2-butylene oxide or the corresponding carbonates such as ethylene carbonate, 1,2-propylene carbonate or 1,2-butylene carbonate is readily followed in the alkoxylation reaction by observing the weight increases of the reaction mixture, any number of moles of the alkylene oxide or alkylene carbonate can be added. The bisymmetrical phenolic compound and the alkylene oxide or alkylene carbonate are simply heated at a temperature ranging from about 110 to 200° C. in the presence of an alkali such as sodium or potassium hydroxide or sodium or potassium carbonate for a period of time until the desired number of moles of alkylene oxide or alkylene carbonate have been added. As an alternative, according to conventional procedures, the alkoxylation reaction may be continued until a 1% solution of the resulting product is homogenenous in water at a temperature of about 40° C. The point at which the solution becomes non-homogeneous or cloudy is called the cloud point.

The following examples, which are merely illustrative, will show the preparation of several types of the new class of bisymmetrical aryl polyhydroxy alkyl ethers. All parts given are by weight.

*Example I*

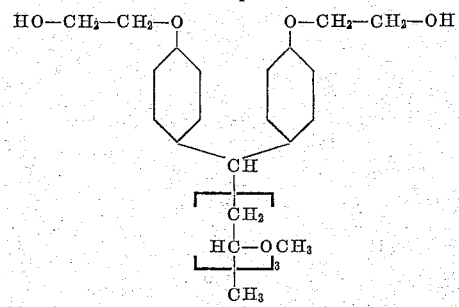

In a three-necked flask equipped with stirrer, thermometer and reflux condenser there were added, while maintaining a temperature of 55–60° C., 106 parts of glacial acetic acid, 106 parts of sulfuric acid of 95–98% concentration, 54 parts of a mixture consisting of 90% phenol and 10% of water. To this mixture, while maintaining the temperature at 55–60° C., there was added dropwise, with continuous stirring, during a period of 20 minutes 120 parts of 1,1,3,5,7-pentamethoxy octane. Shortly thereafter the bis-phenol compound separated and was allowed to stand overnight. The resulting bisphenol compound was dissolved in 10% aqueous sodium hydroxide from which it was precipitated by the addition of carbon dioxide gas.

An intimate mixture was prepared consisting of 40 parts of the above bis-phenol compound, 40 parts of ethylene carbonate and 1.6 parts of potassium carbonate. The mixture was then heated at 120° C. for 17 hours. At the start of the reaction, evolution of carbon dioxide caused foaming which slowly abated as reaction went to completion. The cooled reaction mass was then thoroughly washed with water in a Waring Blendor and then dried. The resulting resin is hard, brittle and non-caking at room temperature. It is still soluble in acetone and methyl ethyl ketone but insoluble in aqueous caustic.

*Example II*

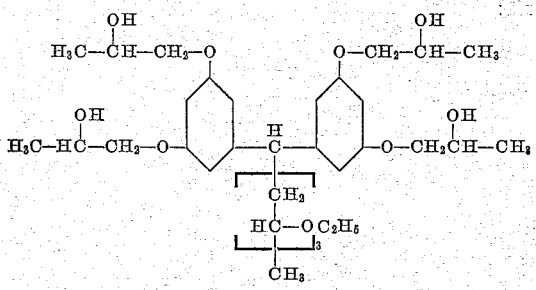

In a three-neck flask equipped with stirrer, and thermometer there were added 53 parts of sulfuric acid of 40% concentration and 12 parts of resorcinol. The stirring was continued and then added dropwise were 15 parts of 1,1,3,5,7-pentaethoxyoctane over a period of 25–30 minutes while maintaining the temperature between 35–40° C. Stirring was continued for an additional 30 minutes and the reaction mixture allowed to stand overnight, then neutralized with 10% aqueous caustic soda which resulted in a clear, stable solution. Addition of carbon dioxide gave a precipitation which was separated by washing with water and drying.

An intimate mixture was prepared consisting of 100 parts of the foregoing dried bis-phenol compound, 90 parts of 1,2-propylene carbonate and 4 parts of potassium carbonate. The mixture was then heated at 125° C. for 18 hours. At the start of the reaction, evolution of carbon dioxide caused foaming which slowly abated as the reaction went to completion. The cooled reaction mass was then thoroughly washed with water in a Waring Blendor and then dried. The resulting resin is hard, brittle, and non-caking at room temperature. It is soluble in acetone and methyl ethyl ketone, but insoluble in aqueous caustic.

*Example III*

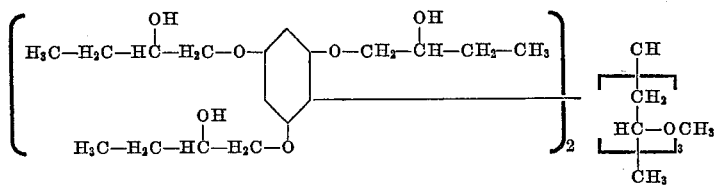

To a three-necked flask equipped with stirrer, thermometer and heat source there were charged at 44° C., 24 parts of phloroglucinol, 42.4 parts of sulfuric acid of 95–98% concentration and 63.6 parts of water. While the phloroglucinol is not completely soluble in the mixture nevertheless it is suspended in solution. To the reaction mixture is added slowly dropwise during 20 minutes 30 parts of 1,1,3,5,7-pentamethoxy octane while maintaining the temperature at 40° C. Shortly thereafter a very stiff resin is formed. After standing overnight the resin is soluble in 20% aqueous sodium hydroxide and was precipitated with carbon dioxide gas.

An intimate mixture was prepared consisting of 70 parts of the above bis-phenol compound, 89.6 parts of 1,2-butylene carbonate and 4 parts of potassium carbonate. The mixture was then heated at 120° C. for 18 hours. At the start of the reaction, evolution of carbon dioxide caused foaming which slowly abated as the reaction went to completion. The cooled reaction mass was then thoroughly washed with water with a Waring Blendor and then dried. The resulting resin is hard, brittle and non-caking at room temperature. It is soluble in acetone and methyl ethyl ketone but insoluble in aqueous caustic.

*Example IV*

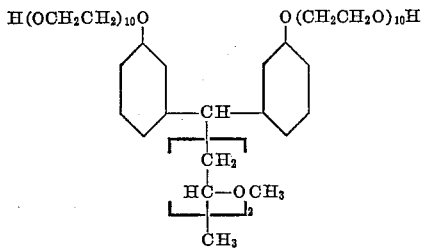

50 parts of the bis-phenol prepared in accordance with Example I was dissolved in 10% aqueous sodium hydroxide solution and the mixture treated with 134 parts of ethylene oxide at 180° C. The cloud point of the resulting product was approximately 50° C.

*Example V*

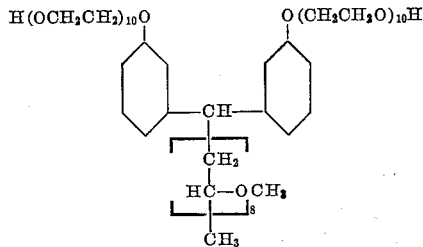

To a 3-necked flask equipped with stirrer, thermometer and reflux condenser there were added 424 parts of commercial grade concentrated sulfuric acid (95–98%) and 424 parts of glacial acetic acid with cooling to maintain the temperature at 50° C. To this was then added 188 parts of phenol dissolved in 10% by weight of water. After the latter mixture had been stirred for a period of a few minutes, there was then added 568 parts of a poly- methoxy acetal obtained by condensing 10 moles of vinyl-methyl ether with 1 mole of methanol dropwise over a 30-minute period while maintaining the temperature between 55–60° C. The reaction content was stirred for an additional 50 minutes and then allowed to stand overnight.

25 parts of the above reaction mixture was dissolved in 5% aqueous caustic to give a clear amber solution. The solution was then treated with 31 parts of ethylene oxide at 180° C.

*Example VI*

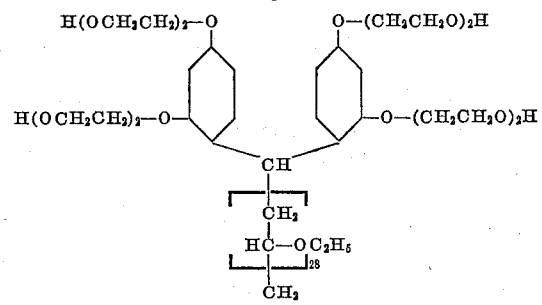

The first part of Example II was repeated with the exception that 15 parts of 1,1,3,5,7-pentaethoxy octane were replaced by 1.5 parts of a polyethoxy acetal obtained by condensing 30 moles of vinyl ethyl ether with 1 mole of ethanol. The reaction mixture was allowed to stand overnight and then neutralized with 10% aqueous caustic soda to yield a clear stable solution.

The solution containing 100 parts of the bis-phenol was treated with 11.1 parts of ethylene oxide at 180° C.

*Example VII*

Example II was repeated with the exception that 12 parts of resorcinol were replaced by 15 parts of α-naphthol. One hundred parts of the resulting bis-phenol compound was dissolved in 10% aqueous sodium hydroxide solution.

The foregoing alkaline solution was then treated with 95 parts of ethylene oxide at 180° C.

*Example VIII*

Example I was repeated with the exception that 24 parts of phloroglucinol were replaced by 30 parts of 2-anthrol. After completion, the reaction mixture was allowed to stand overnight, then neutralized with 10% aqueous caustic soda.

The foregoing caustic soda solution was treated with 135 parts of 1,2-propylene oxide at a temperature of 180° C.

The products of the foregoing examples are resinous in nature and are especially adaptable for the preparation of varnishes, lacquers, enamels and electrical insulating mediums by conventional procedures. They are also useful in the preparation of molding compositions. The filler material which is usually wood flour, is uniformly impregnated with a solution of the resin in acetone or methyl ethyl ketone, equal parts of resin and filler being normally employed. The mixed product is dried to eliminate the solvent and then ground. The ground material is then molded in the conventional manner. Solutions of the resins in acetone or methyl ethyl ketone and further diluted with alcohols are very useful in impregnating sheets of paper, cloth, etc., which are to be pressed together to form stiff sheets and blocks.

All of the foregoing bisymmetrical aryl polyhydroxyalkyl ethers are readily sulfated and sulfonated by conventional means to yield a new class of water-soluble products useful as detergents, emulsifiers, wetting agents, and the like.

It is to be noted that monoethers of the bis-phenol compounds, utilized in accordance with the present invention, can be obtained by adding corresponding chlorohydrins to the bis-phenols in the presence of alkali.

This application is a continuation-in-part of our pending application Serial No. 764,231, filed September 30, 1958, for "Bisymmetrical Phenolic Compounds," now United States Patent 3,061,650.

Each of the products prepared in accordance with the foregoing examples was found to be an excellent tanning agent. Tanning is effected by milling the skin at a pH of 2–9 with the agent.

We claim:

1. A compound having the following general formula:

$$(H[-O-\overset{R_1}{\underset{|}{C}HCH_2}]_x-O)_n-A-\overset{H}{\underset{|}{C}}-A-(O-[CH_2\overset{R_1}{\underset{|}{C}H}-O-]_xH)_n$$

$$\overset{|}{\underset{\overset{|}{CH_2}}{}}$$

$$\left[\overset{|}{\underset{\overset{|}{CH_3}}{RO-CH}}\right]_m$$

wherein A represents an aryl group selected from the class consisting of phenyl, naphthyl, and anthracyl, R represents an alkyl radical of 1 to 5 carbon atoms, $R_1$ represents a member selected from the class consisting of hydrogen, methyl and ethyl groups, $m$ represents a positive integer of from 2 to 30, $n$ represents a positive integer of from 1 to 3, and $x$ represents a positive integer of from 1 to 40.

2. A compound having the following formula:

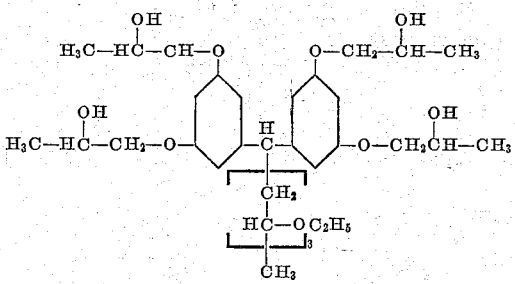

3. A compound having the following formula:

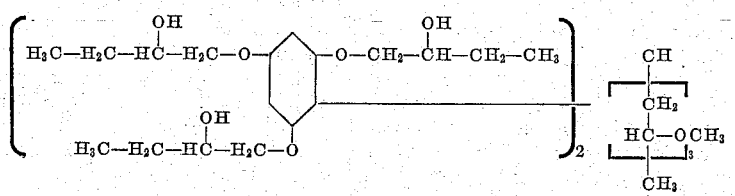

4. A compound having the following formula:

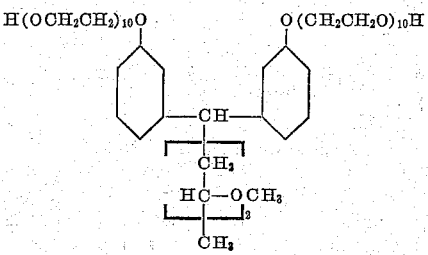

5. A compound having the following formula:

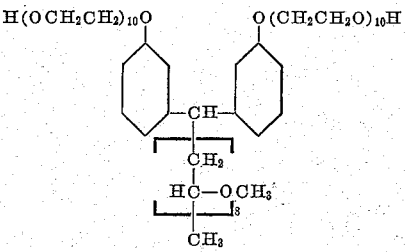

6. A compound having the following formula:

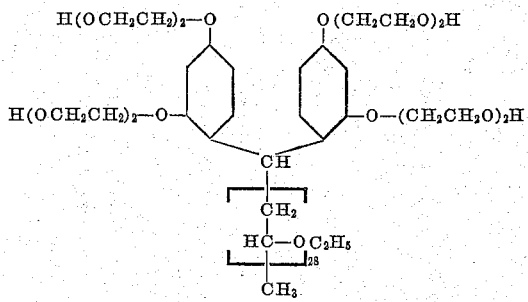

7. A compound having the following formula:

$$\text{H}(\text{OCH}_2\text{CH}_2)_2-\text{O}\quad\quad\text{O}(\text{CH}_2\text{CH}_2\text{O})_2\text{H}$$

H(OCH₂CH₂)₂—O—[phenyl]—[CH bridge]—[phenyl]—O—(CH₂CH₂O)₂H with pendant group:
CH—CH₂—[HC—OC₂H₅]₂₈—CH₃

References Cited in the file of this patent

UNITED STATES PATENTS

| | | |
|---|---|---|
| 2,454,541 | Bock et al. | Nov. 28, 1948 |
| 2,504,064 | Bock et al. | Apr. 11, 1950 |